Aug. 19, 1958      E. K. POST      2,848,602
DETECTOR FOR DRAGGING EQUIPMENT ON RAILROADS
Filed June 9, 1954      4 Sheets-Sheet 1
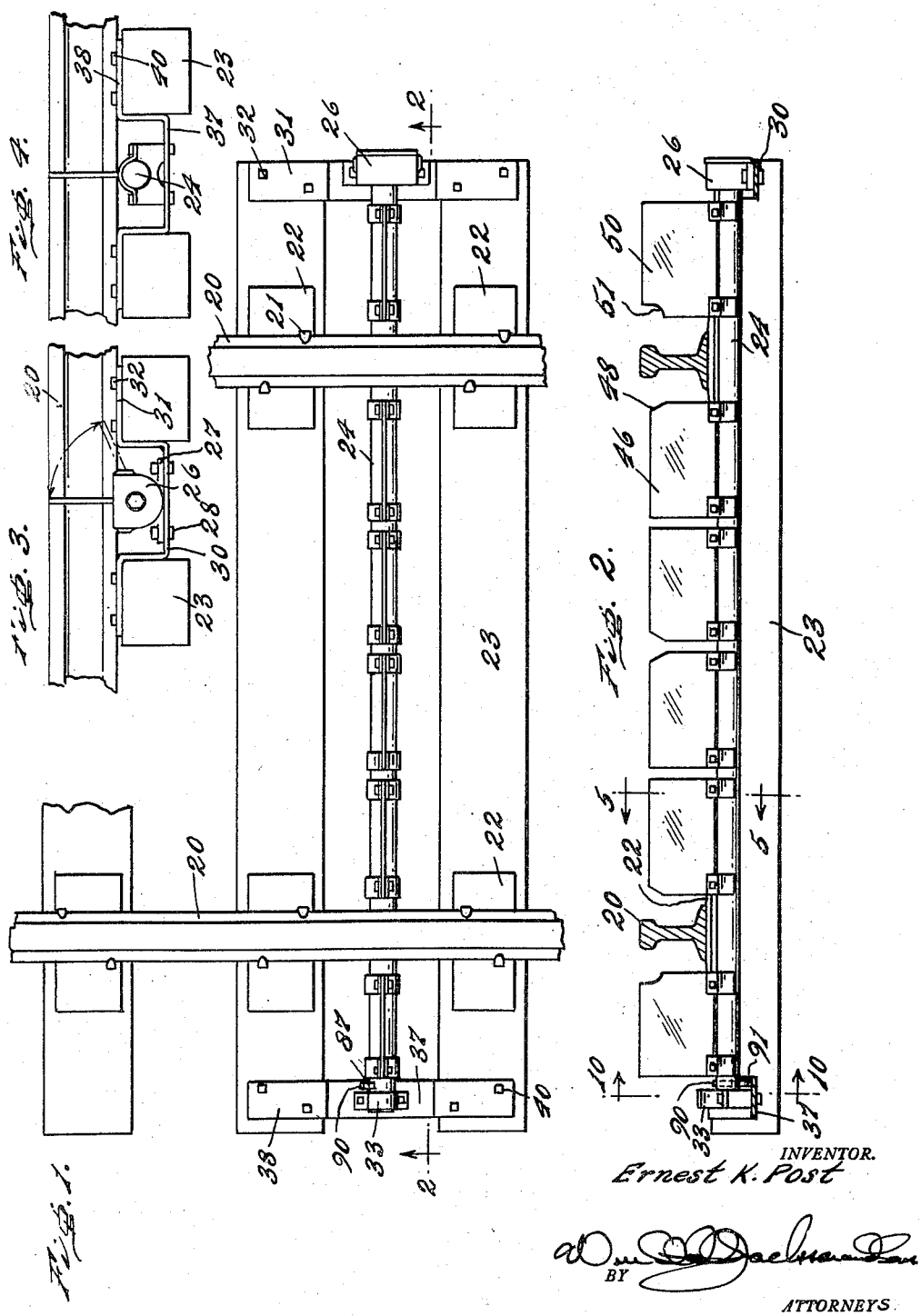
INVENTOR.
Ernest K. Post
BY
ATTORNEYS

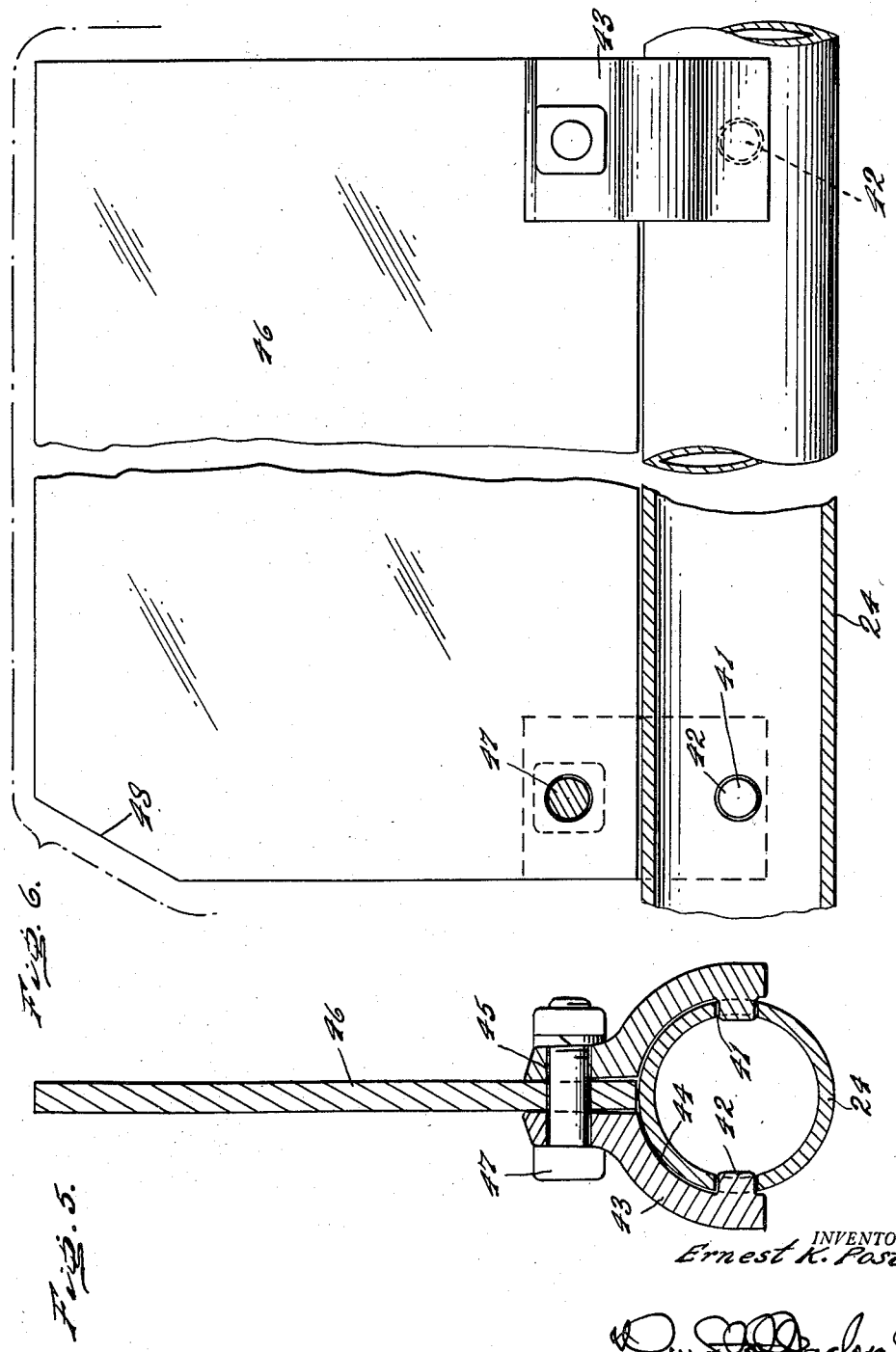

Aug. 19, 1958   E. K. POST   2,848,602
DETECTOR FOR DRAGGING EQUIPMENT ON RAILROADS
Filed June 9, 1954   4 Sheets-Sheet 3
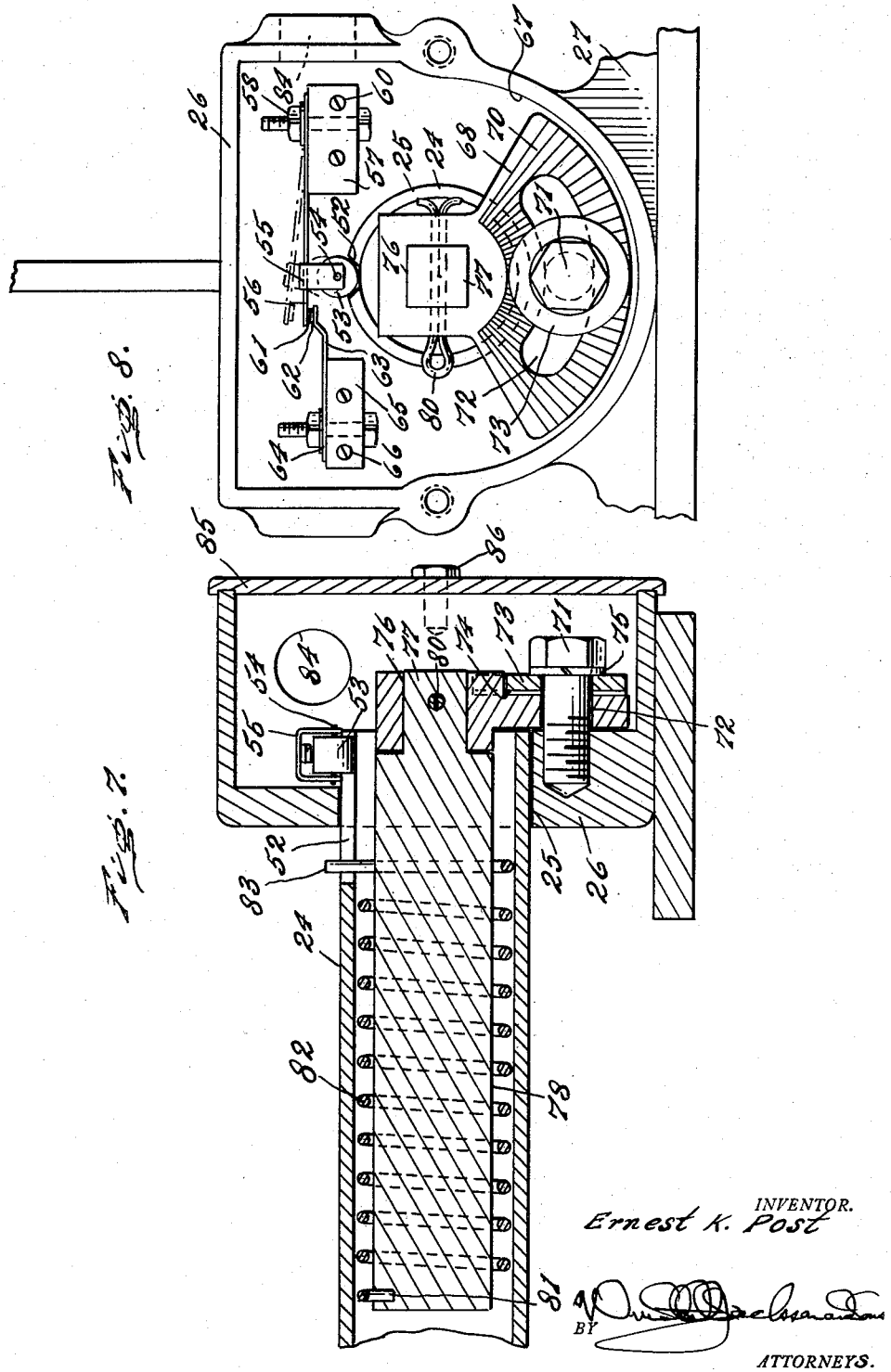
INVENTOR.
Ernest K. Post
BY
ATTORNEYS.

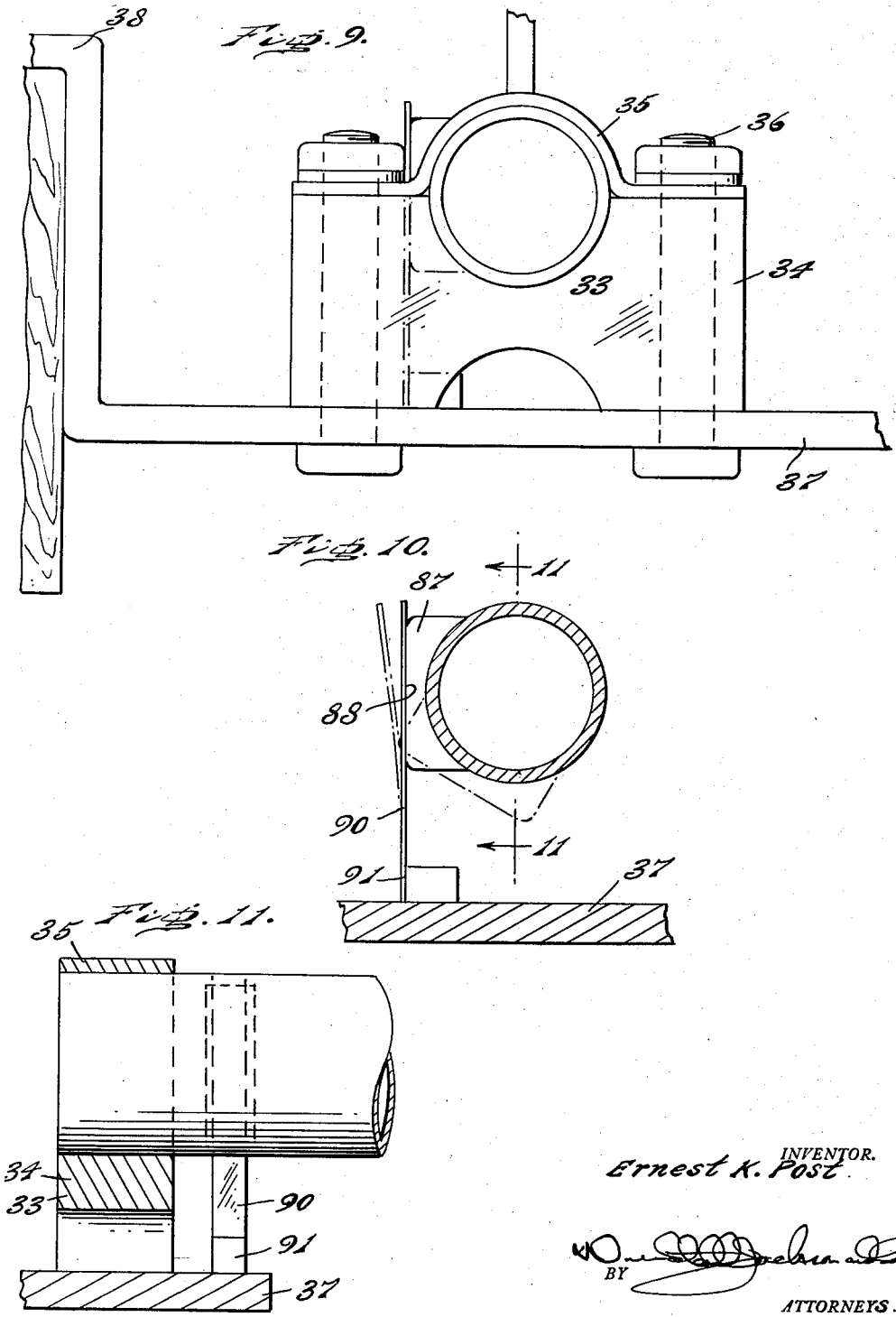

United States Patent Office 2,848,602
Patented Aug. 19, 1958

2,848,602

DETECTOR FOR DRAGGING EQUIPMENT ON RAILROADS

Ernest K. Post, Collingswood, N. J., assignor to National Accessories Corporation, Philadelphia, Pa., a corporation of Delaware Application June 9, 1954, Serial No. 435,579

1 Claim. (Cl. 246—246)

The present invention relates to detectors for dragging equipment on railroads, particularly of the type which set a signal when dragging equipment encounters a detector plate.

A purpose of the invention is to simplify the mounting of detector plates, and to avoid the necessity of closing the interior of the tubular shaft of the detector by the detector plate mounting.

A further purpose is to make a plurality of detector plates and the detector plate mountings interchangeable.

A further purpose is to reduce the cost of manufacture of dragging equipment detectors, and particularly to simplify the contact mounting and the contact housing, and the interconnection between the detector and the contact housing.

A further purpose is to provide a cam surface directly on the shaft of the detector and to operate the contacts by a follower engaging the cam surface.

A further purpose is to mount a spring abutment angularly adjustable on the end of the detector and extend the spring abutment into the hollow end of the tubular shaft, and to interpose a torsion spring in the space between the spring abutment and the tubular shaft, engaging the spring at one end with the spring abutment and at the other end with the tubular shaft.

A furthur purpose is to provide an abutment on the shaft suitably at the end remote from the contacts and to engage the abutment by a leaf spring to prevent tampering with the equipment.

A further purpose is to construct the entire device in self-contained form on the shaft or immediately at the end of the shaft so as to avoid the need for remotely located equipment which will add to the complexity of construction and to difficulty in installation.

A further purpose is to make the entire device conveniently reusable without the necessity for making major replacements in ordinary cases.

Further purposes appear in the specification and in the claims.

In the drawings I have chosen to illustrate only one of the numerous embodiments in which my invention may appear, selecting the form shown from the standpoints of convenience in illustration, satisfactory operation and clear demonstration of the principles involved.

Figure 1 is a fragmentary top plan view of the detector of the invention.

Figure 2 is a section of Figure 1 on the line 2—2.

Figure 3 is a right end elevation of Figure 1.

Figure 4 is a left end elevation of Figure 1.

Figure 5 is a fragmentary enlarged section on the line 5—5 of Figure 2.

Figure 6 is a fragmentary side elevation partly in axial section.

Figure 7 is an enlarged fragmentary axial section at the contact end.

Figure 8 is an enlarged fragmentary end elevation at the contact end, omitting the cover plate.

Figure 9 is a fragmentary enlarged end elevation at the end remote from the contacts.

Figure 10 is a fragmentary detail section at the end remote from the contacts, the section being taken immediately behind the end bearing on the line 10—10 of Figure 2.

Figure 11 is a fragmentary enlarged axial section at the end remote from the contact end on the line 11—11 of Figure 10.

Serious accidents have occurred on railroads due to dragging equipment which has fallen to a position adjoining the roadbed unknown to the train crews, and which remains in this position until it encounters a switch or the like, which derails the train and causes an accident. In the prior art, dragging equipment detectors have been produced which depended upon the breaking of a frangible element of cast iron or the like to open a circuit and set a signal in order to stop the train. In a later embodiment, a device has been produced which pivotally mounts detector plates and permits them to deflect, opening electric contacts, and then to restore to operative condition.

The present invention is designed to produce a simpler, less expensive and more reliable dragging equipment detector of the type which is restored to operating condition after the detector plates have been deflected. In accordance with the invention, several advantages in production are incorporated, which lead to reduction in expenses and elimination of complexity.

It is no longer necessary in the device of the invention to use a square shaft or a tubular shaft drilled off center to mount the detector plates. A very simple mounting has been devised, by which the detector will hold on the tubular shaft without closing the interior of the shaft, and without the necessity of drilling off center.

Furthermore the detector plates are simplified and rendered largely interchangeable.

In the light of some of the prior art constructions, it is not necessary to use any special interlinkage to connect the pivoted shaft with a remote contact mechanism. The contact mechanism is desirably provided in a housing on the end of the shaft, and also desirably operated directly from the shaft acting as a cam. Likewise a simple torsional spring arrangement is mounted adjustably in the end of the tubular shaft to restore the shaft to equilibrium position.

Precautions are also taken in accordance with the invention to prevent tampering with the device.

Considering now the drawings in detail, a railroad track is shown comprising rails 20 secured by spikes 21 on tie plates 22 mounted on ties 23.

Extending across beneath the rails is a tubular shaft 24 which at one end journals in a cylindrical opening 25 in a contact housing or bracket 26 having mounting lugs 27 bolted at 28 on a frame 30 which is hung in the space between two ties and has arms 31 screwed at 32 to the tops of the ties.

At the other end the tubular shaft journals in a bearing 33 having a base 34 and a cap 35 united by bolts 36 to a frame 37 which is hung in the space between two ties by arms 38 screwed at 40 to the tops of the ties.

At intervals along its length corresponding to the opposite ends of detector plates, the shaft 24 is transversely drilled at 41 to receive bosses 42 on lugs 43 each of which conforms at its inner surface 44 to the curve of the outside of the shaft, and which has a bolt hole 45 at the top. The two lugs are opposed on opposite sides of the tubular shaft and engage the opposite faces of detector plate 46, one set of lugs desirably being provided at each end of the detector plate. The detector plate is secured to the lugs by bolts 47. It will be evident that the detector plates used in the space between the rails may desirably be interchangeable and suitably rectangular with cut off corners 48, which can be disposed either at the right or the left depending upon how the mechanism is preferably mounted. Usually the cut off corners are provided adjacent the rails and at the center. Outside of the rails, detector plates 50 are provided which are slightly higher but otherwise the same but suitably have recessed corners 51 adjoining the rail, the recesses being located at the desired side simply by turning the detector plates as they are mounted.

At the end of the shaft having the contact housing 26, the tubular shaft has near its top when in central position a cam recess 52 extending longitudinally, and suitably tapered on its opposite sides to receive follower roller 53 pivoted at 54 on a yoke 55 mounted on a contact strip 56 secured on an insulating terminal block 57 by a binding post 58. The terminal block is mounted in the housing by screws 60. The contact strip has a contact button 61 at the end remote from the terminal block and in normal closed position engages a contact button 62 on a stationary contact strip 63 secured to binding post 64 on an insulating terminal block 65 mounted by screws 66 in the housing.

The lower portion of the housing 26 has an arcuate space 67 in which a segmental extension or quadrant 68 is provided which has radial notches 70 and is locked in any desired position by a bolt 71 extending into the housing through an arcuate slot 72 and having a washer 73 provided with a radial rib 74 which engages in one of the radial notches 70 of the quadrant and holds adjusted position. A lock washer 75 is used between the washer 73 and the bolt.

The quadrant has a square hole 76 in line with the axis of the tubular shaft, and this receives the squared head 77 of a cylindrical spring abutment 78 which is secured to the quadrant by cotter pin 80. The spring abutment 78 is in spaced relation to the bore of the tubular shaft and has at one end a radial recess 81 which engages one end of a helical torsion spring 82, the other end being engaged at 83 in the slot 52 which extends beyond the housing.

Suitable signal circuits which will set the signal when the contacts are open are connected across between the terminals, and the signal will be set when the detector plates cause the shaft to turn when the plates encounter dragging equipment.

A suitable conduit for electrical lead-in purpose is connected at 84 to the side of the housing. The housing is closed by a cover plate 85 secured by bolts 86.

At the remote end from the contacts, and desirably in the space between the bearings, the tubular shaft carries an abutment 87 which has a flat surface 88 disposed at a desired angle, suitably vertically, when the detector plates are vertical. A leaf spring 90 is mounted on a block 91 on the frame 37 and extends up to engage the abutment 87 and prevent the detector from operating unless a predetermined load is applied. This avoids the danger of tampering, particularly by children.

In operation, with the equipment assembly as shown in the drawings, bolt 71 is loosened and the quadrant turned until the detector plates are vertical under the action of the torsion spring when no load is applied by dragging equipment. The bolt 71 is then tightened and this establishes the follower roller 53 in the cam slot 52, closing the contact. At the same time the shaft is held in the proper vertical position by the leaf spring 90.

When dragging equipment encounters one of the detector plates, the detector plate is deflected and the tubular shaft turns, opening the contacts and setting the signal to stop the train. As soon as the dragging equipment ceases to engage, the spring 82 is strong enough to restore the detector plates to vertical position and the device is ready to function again.

If the dragging equipment has broken one of the detector plates, the damage will ordinarily be merely to break the lugs 43 which can readily be carried by track repairmen and can be replaced easily. Even if one of the plates itself is broken, this can readily be replaced and the device is operative except for the individual broken plate in the meantime.

It will, of course, be evident that if desired the spring abutment 78 may be tubular, in which case the whole interior of the shaft may be used to carry electrical connections from one side to the other of the track.

It will be evident that while in the construction shown in the drawings the contact arrangement, torsion spring, and cam for actuating the contacts is provided in a housing at one end of the shaft, with a plain bearing and device to prevent tampering at the other end of the shaft, I will where desired employ the identical housing having the contacts, torsion spring and cam at both ends of the shaft, thus dividing the spring requirement between the two ends, and providing contacts which are accessible at either or both ends as desired.

In view of my invention and disclosure variations and modifications to meet individual whim are particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In a dragging equipment detector for a railroad track, a shaft extending across beneath the rails, generally horizontal bearings which pivotally mount the shaft and permit the same to turn, detector plates mounted on the shaft and extending upwardly so as to encounter dragging equipment when such is present, a torsion spring at one end of the shaft coaxial with the shaft, a spring anchorage for one end of the torsion spring connecting the torsion spring with the shaft, a spring abutment coaxial with the torsion spring and connected to the opposite end of the torsion spring from that connected to the shaft, the shaft, the torsion spring and the spring abutment being in relatively telescoping relation to one another, a segmental extension which is mounted on the abutment, extends radially outwardly and has an arcuate slot whose curvature is coaxial with the shaft, a bracket engaging one side of the segmental extension and bolt means extending generally parallel to the shaft axis through the arcuate slot in the segmental extension, holding the segmental extension in adjusted position against the bracket.

References Cited in the file of this patent

UNITED STATES PATENTS

| | | |
|---|---|---|
| 895,297 | Peter | Aug. 4, 1908 |
| 958,052 | Williams | May 17, 1910 |
| 1,007,830 | Whitmore | Nov. 7, 1911 |
| 1,195,885 | Welsch | Aug. 22, 1916 |
| 1,428,759 | Crain | Sept. 12, 1922 |
| 1,559,842 | Bollinger | Nov. 3, 1925 |
| 1,972,418 | Greer | Sept. 4, 1934 |
| 2,662,973 | McGowan et al. | Dec. 15, 1953 |
| 2,677,048 | Woods et al. | Apr. 27, 1954 |
| 2,691,722 | Lewis | Oct. 12, 1954 |